United States Patent [19]
Reismiller et al.

[11] Patent Number: 5,486,997
[45] Date of Patent: Jan. 23, 1996

[54] PREDICTOR ALGORITHM FOR ACTUATOR CONTROL

[75] Inventors: Paul R. Reismiller, West Chester; George A. Brunemann, Jr., Cincinnati, both of Ohio

[73] Assignee: General Electric Company, Cincinnati, Ohio

[21] Appl. No.: 285,836

[22] Filed: Aug. 4, 1994

[51] Int. Cl.[6] .................................................. G05B 13/02
[52] U.S. Cl. .......................................... 364/165; 364/153
[58] Field of Search ................................. 364/153, 154, 364/165, 164, 150, 184, 552, 183, 185, 162; 318/609, 610, 611, 632, 568.11; 365/552

[56] References Cited

U.S. PATENT DOCUMENTS

| | | | |
|---|---|---|---|
| 4,320,463 | 3/1982 | Himnelstein | 364/552 |
| 4,390,942 | 6/1983 | de Keiter | 364/162 |
| 4,494,207 | 1/1985 | Chang et al. | 364/184 |
| 4,509,110 | 4/1985 | Levesyve, Jr. et al. | 364/153 |
| 4,542,471 | 9/1985 | Inaba et al. | 364/185 |
| 4,630,189 | 12/1986 | Ohmori et al. | 364/150 |
| 4,694,390 | 9/1987 | Lee | 364/165 |
| 4,864,206 | 9/1989 | Onaga et al. | 318/568.11 |
| 4,987,528 | 1/1991 | O'Brien | 364/184 |
| 4,999,557 | 3/1991 | Inoue | 364/183 |
| 5,206,810 | 4/1993 | Bools et al. | 364/431.02 |
| 5,233,512 | 8/1993 | Gutz et al. | 364/150 |
| 5,335,185 | 8/1994 | Pitts et al. | 364/153 |
| 5,414,632 | 5/1995 | Mochizuki et al. | 364/153 |

*Primary Examiner*—James P. Trammell
*Attorney, Agent, or Firm*—Andrew C. Hess; Nathan D. Herkamp

[57] ABSTRACT

A predictor algorithm for an actuator control is provided in a servo-actuator system. The predictor algorithm receives a signal representative of the torque motor current supplied to the servovalve controlling the actuator and uses that signal to predict the change in actuator position over a single time interval. If the measured actuator position for the previous time interval is within the maximum value and the minimum value for that time interval, then the next maximum and minimum values are calculated by adding the predicted change to the previous measured signal. If the measured actuator signal for the previous time interval is outside the maximum and minimum values for that time interval, then the next maximum and minimum values are calculated by adding the predicted change to the previous maximum and minimum values. A fault is indicated when the measured signal falls outside the maximum and minimum values for a predetermined number of time intervals. In a further embodiment of the present invention, the gain of the torque motor is tracked and used to adjust the maximum and minimum values for various operating conditions.

26 Claims, 4 Drawing Sheets

PREDICTOR ALGORITHM FOR ACTUATOR CONTROL

BACKGROUND OF THE INVENTION

1. Field of the Invention

The present invention relates generally to closed loop feedback control systems for actuators, and, more specifically, to an algorithm for predicting change in actuator position in order to reduce the tolerance range between maximum and minimum values utilized for detecting faults in the actuator feedback control system.

2. Description of the Related Art

In actuator feedback control systems using a position indicator in the feedback loop, such as a Linear Variable Differential Transducer (LVDT), it is necessary to detect errors or faults in the control loop. For example, the LVDT may fail, providing an erroneous reading of the actuator position. Such errors are generally detected by comparing a signal representative of the measured movement to a modeled signal based upon the demanded actuator movement, where the modeled signal has maximum (roof) and minimum (floor) values for a given demand signal. If the measured signal is outside the maximum or minimum value for a given demand signal, the system indicates a fault.

In many systems, it has been necessary to use a large tolerance range between the maximum and minimum values to avoid false faults caused by the accumulation of errors over several time intervals or frames. This may occur, for example, during a step change in demand or due to slew rate variation. This large tolerance range, however, reduces the ability of the system to detect in-range failures, and consequently to distinguish actual failures from false failures.

Accordingly, it would be advantageous to design a system where the tolerance range is minimized without increasing the risk of false faults. It would further be advantageous to design a system where the tolerance range is minimized by using an algorithm which predicts the change in actuator position for each interval of time, thereby eliminating the accumulation of errors over consecutive time intervals.

SUMMARY OF THE INVENTION

In accordance with the present invention, a predictor algorithm for an actuator control is provided for a servo-actuator system. The predictor algorithm receives a signal representative of the torque motor current supplied to the servovalve controlling the actuator and uses that signal to predict the change in actuator position over a single time interval. If the measured actuator position for the previous time interval is within the maximum value (roof) and the minimum value (floor) for that time interval, then the next maximum and minimum values are calculated by adding the predicted change to the previous measured signal. If the measured actuator signal for the previous time interval is outside the maximum and minimum values for that time interval, then the next maximum and minimum values are calculated by adding the predicted change to the previous maximum and minimum values. A fault is indicated when the measured signal falls outside the maximum and minimum values for a predetermined number of time intervals. In a further embodiment of the present invention, the gain of the torque motor is tracked and used to adjust the maximum and minimum values for various operating conditions.

BRIEF DESCRIPTION OF THE DRAWING

The novel features of the invention are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
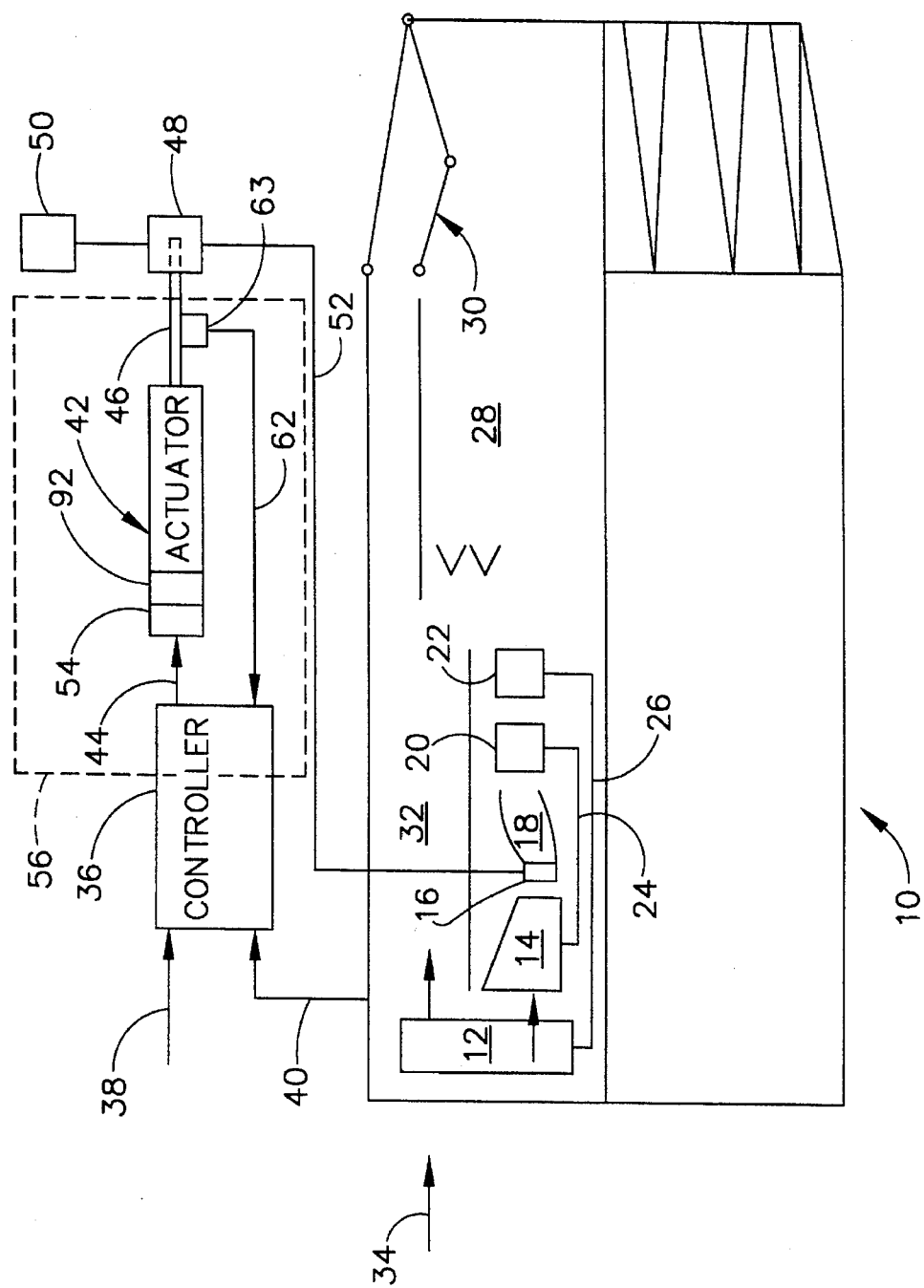
FIG. 1 is a schematic representation of an exemplary gas turbine engine including an engine control system having an actuator feedback control and fault detection system in accordance with the present no invention.

Illustrated in FIG. 1 is a schematic representation of an exemplary augmented turbo-fan gas turbine engine 10. The engine 10 includes conventionally in serial flow communication a fan 12, a compressor 14, a fuel injection assembly 16, a combustor 18, a high pressure turbine 20, and a low pressure turbine 22. The high pressure turbine 20 is conventionally joined to the compressor 14 through a high pressure rotor shaft 24, and the low pressure turbine 22 is conventionally joined to the fan 12 by a fan rotor shaft 26. The engine 10 further includes a conventional afterburner, or augmenter, 28 disposed downstream of the low pressure turbine 22, and a conventional variable area exhaust nozzle 30 disposed downstream of the augmenter 28. A conventional bypass duct 32 surrounds the compressor 14 and extends from the compressor 14 downstream to the low pressure turbine 22 for bypassing a portion of inlet air 34 from entering the compressor 14.

The engine 10 further includes an engine controller 36 which is responsive to a conventional signal, or signals, 38, such as throttle position, and is also responsive to an engine condition signal, or signals, 40 for controlling operation of the engine 10. The engine controller 36 is conventional, except for the incorporation therein of the present invention as described hereinafter, and is effective for controlling numerous actuators and functions of the engine 10.

The engine 10 includes a plurality of conventional actuators 42, only one of which is shown, for controlling the positions of various components in the engine 10 in response to a respective actuator input signal 44 from the controller 36, In the exemplary embodiment of the invention illustrated in FIG. 1, the actuator 42 comprises a linear actuator having an extendable and retractable output rod 46 conventionally secured to a fuel metering valve 48 for controlling the operation thereof. A conventional fuel supply 50 is disposed in fuel communication with the valve 48 for providing fuel thereto. The valve 48 is conventionally joined in fluid communication to the fuel injection assembly 16 by conventional fuel conduits 52.

The actuator 42 is a conventional hydro-mechanical mechanism having an electrical interface 54 (e.g., a torque motor) which controls the position of the output rod 46 in direct response to the input signal 44 provided to the interface 54 from the engine controller 36. In response to the throttle signal 38, for example, the engine controller 36 provides the input signal 44 to the actuator 42 for controlling the fuel metering valve 48 and thereby controlling the amount of fuel provided from the fuel injection assembly 16 into the combustor 18 for powering the engine 10.

For example, the controller 36 can cause the fuel metering valve 48 to introduce fuel into the combustor 18 for causing the fan rotor 26 to rotate at about 95% speed, which is a conventional corrective rotor speed. In the event of a failure of the actuator 42 during operation of the engine 10, it is desirable to detect that failure, or fault, for taking remedial action. The remedial action could be the shutting down of the engine 10 by conventional means (not shown) in response to the controller 36. In the event the failure is not due to the actuator 42 itself, but a portion of the controller 36 separate from the actuator 42, the controller 36 can take remedial action by switching to a redundant circuit having a redundant input signal 44 to a redundant portion of the electrical interface 54 and using a redundant actuator output position sensor as is conventionally known. However, in a situation where the fan rotor 26 is operating at relatively high speed such as 95% rated speed, the fault must be detected and the remedial action effected in a relatively quick time, for example about 100 milliseconds, or less, to prevent compressor stall, or rotor overspeed, for example.

Figure 2:
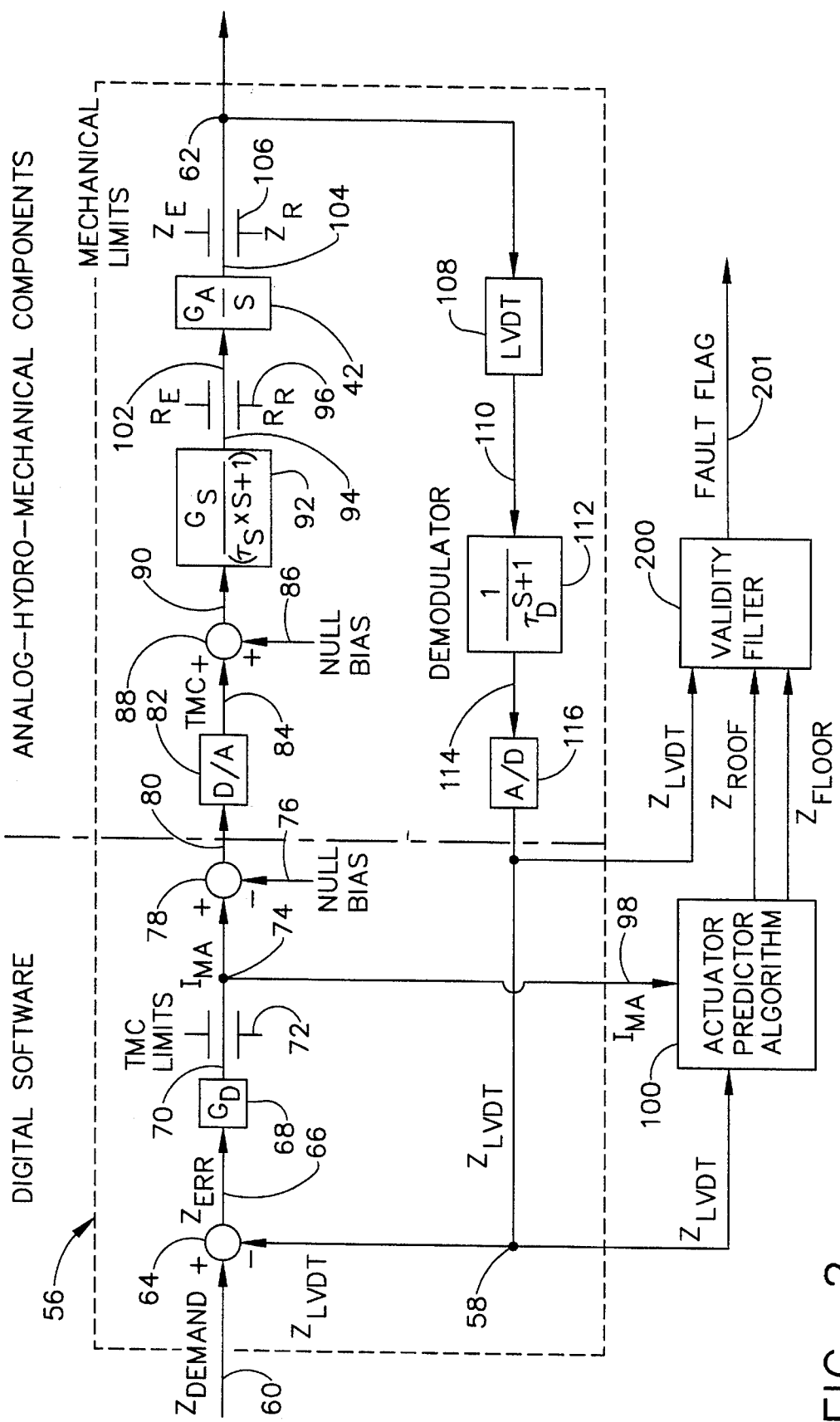
FIG. 2 illustrates a schematic diagram of an actuator feedback control including a predictor algorithm according to the present invention.

Illustrated in FIG. 2 is a conventional actuator closed loop feedback control 56 and an actuator predictor algorithm 100 of the present invention utilized therewith. The rectangular dashed boxed 56 in FIG. 1 indicates the area represented in greater detail by the same in FIG. 2. Accordingly, the dashed box 56 includes a portion of controller 36, analog/digital conversion devices 82 and 116, and components of the torque motor 54-servovalve 92-actuator 42. The feedback control system 56 includes conventional means for providing a feedback signal 58 indicative of the output of the actuator 42, as represented by the output position signal 62. The feedback means is schematically represented by the position feedback loop and is conventional. The feedback control system 56 further includes conventional means 64 for comparing an output demand signal 60, with the feedback signal 58 for providing an actuator output error signal 66. The comparing means, or comparator, 64 simply takes the difference between the position demand signal 60 and the feedback signal 58 by subtracting the feedback signal 58 from the position demand signal 60. The feedback control system 56 further includes an amplifier means 68 for providing to the actuator 42 the input signal 44 proportional to the error signal 66 which may be accomplished by applying a conventional gain to the error signal 66. It will be understood that the gain utilized in amplifier means 68 is a constant for a given actuator, based upon the head and rod areas of the actuator and the servovalve gain thereof, For example, the servovalve gain of actuator 42 is approximately 0.02 cubic inches per milliampere and the actuator area is approximately 0.6 square inches, where the gain to be applied by amplifier means 68 is approximately 608.0 milliamperes per inch.

Next, the amplified error signal 70 must be maintained within the current limits of the torque motor utilized in actuator 42, as designated by the numeral 72. Such current limits are a function of what the servovalve of the actuator can handle, and in this instance the limits may be positive or negative 80 milliamps. The resultant signal is known as the current demanded 74 of the torque motor, also known as $I_{MA}$. The demand current signal 74 not only is utilized to adjust the position of actuator 42, but also is an input 98 to the actuator predictor algorithm 100 as shown in FIG. 2. The demand current 74 is then compared to a null bias 76 in comparator 78. The null bias 76 is equivalent to the null bias 86 of the actuator torque motor, which acts as a failsafe to ensure that actuator 42 will fail in a safe direction if a fault is found in the torque motor current 84.

While the actuator feedback control system 56 may be implemented in analog, dedicated digital, or computer (software) embodiments, FIG. 2 shows it to be in a digital form. Accordingly, a digital-to-analog converter 82 is utilized to transform the signal 80 emanating from comparator 78 to a physical current 84. This physical current 84 is once again compared to a null bias 86 of the torque motor in a comparator 88, with the output signal 90 therefrom entering the electro-hydraulic servovalve 92. It will be noted that the fraction $G_s/(\tau_s \times S+1)$ in electro-hydraulic servovalve 92 relates to the gain of the servovalve divided by a lag effect being applied thereto. The output signal 94 from the electro-hydraulic servovalve 92 then must be maintained within the extending ($R_E$) and retracting ($R_R$) slew rate limits 96, which are dependent upon the physical limits of the servovalve 92, and particularly the limitation on the size of the orifice therein. The signal 102 then enters the actuator 42, where the reciprocal of the actuator area $G_A$ is divided by a LaPlace Transform which is a pure integrator to provide an output 104, preferably in units of inches. Output signal 104 must also be subjected to the mechanical limits ($Z_E$ and $Z_R$) of the actuator 42 as shown by 106. It will be understood that $Z_E$ is the extension limit of the actuator and $Z_R$ is the retracting limit of the actuator. Accordingly, output position signal 62 is representative of the actuator position and is utilized to provide the feedback signal 58.

In order to make the feedback signal 58 usable by the digital control, the actuator output position signal 62 must be input into a Linear Variable Differential Transducer (LVDT) 108, where the position of the actuator is transformed into an AC voltage. The corresponding AC voltage signal 110 then enters a demodulator 112, where $1/(\tau_D \times S+1)$ is once again a time lag. The demodulator 112 is able to transform the AC voltage signal 110 to a DC voltage 114, whereupon DC voltage signal 114 enters an analog-to-digital converter 116 in order to provide feedback signal 58, also known as $Z_{LVDT}$.

The digital signal $Z_{LVDT}$, which is representative of the actuator position, is not only compared to the position demand signal 60 as described hereinabove, but also is utilized as an input to the actuator predictor algorithm 100 and to a validity filter 200, which will be described hereinafter.

Figure 3:
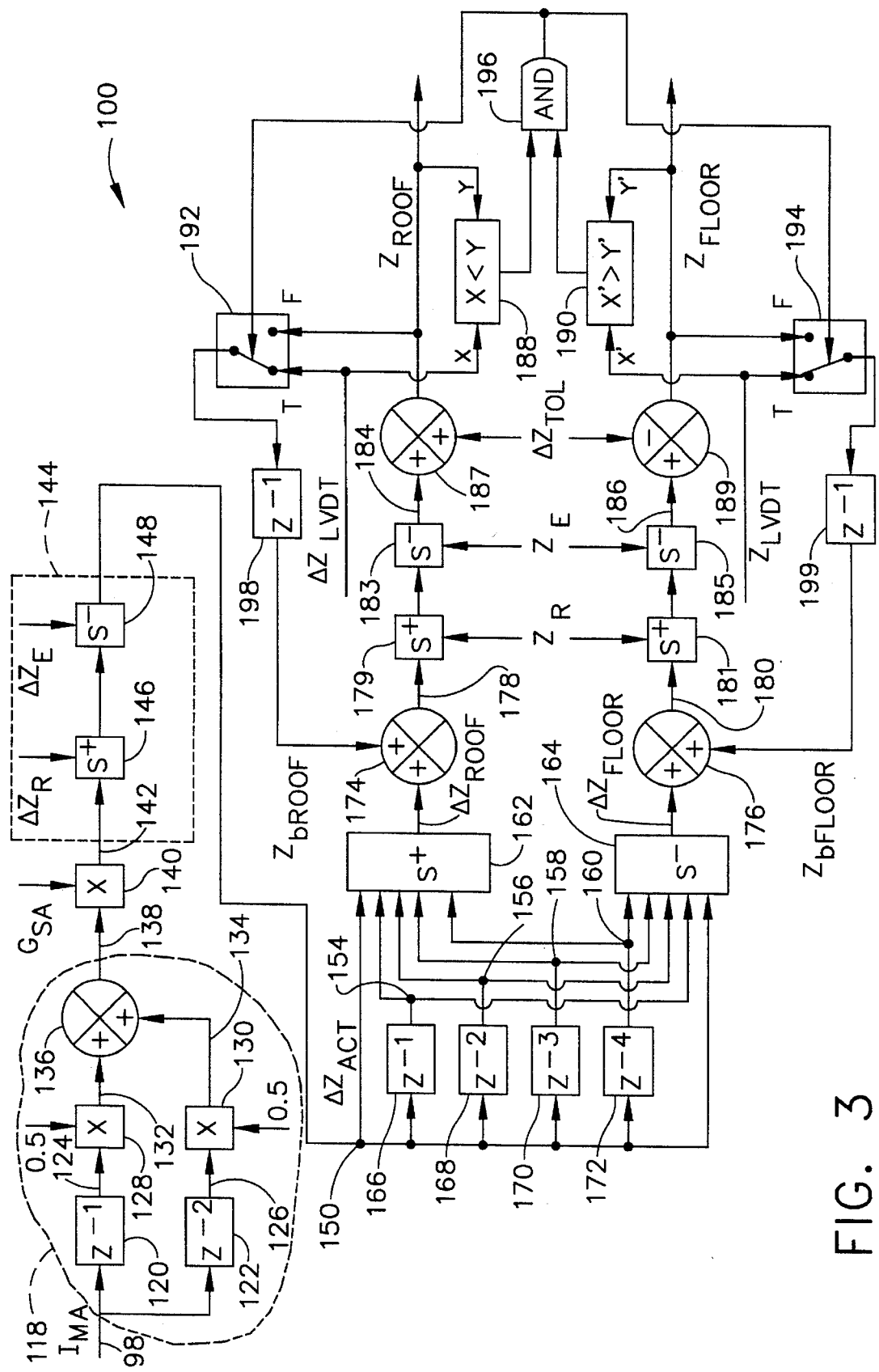
FIG. 3 illustrates a schematic diagram of the predictor algorithm according to the present invention.

With respect to the actuator predictor algorithm 100, FIG. 3 depicts a schematic representation of the preferred embodiment. It will be seen that the torque motor current demanded 98, as indicated above, enters a trapezoidal compensator 118 in order to be averaged. Specifically, trapezoidal compensator 118 delays the torque motor current 98 in delay circuits 120 and 122. It will be seen that delay circuit 120 delays torque motor current 98 for one time interval, while time delay circuit 122 delays the torque motor current 98 for two time intervals. By way of example, the time interval, or frame, utilized by the controller 36 is 10 milliseconds. In order to reduce the load on the microprocessor in controller 36, the actuator predictor algorithm 100 of the present invention may run half as fast between calculations (e.g., 20 milliseconds). The outputs 124 and 126 from time delay circuits 120 and 122 are then multiplied by 0.5 in multipliers 128 and 130, respectively. The output signals 132 and 134 therefrom are then summed in summing circuit 136 to produce an average current signal 138. It will be understood that trapezoidal compensator 118 may not be necessary or may be replaced by other compensators and certain embodiments of the present invention.

The output signal 138 from the trapezoidal compensator 118, which is representative of an average value of the torque motor current $I_{MA}$, is then multiplied in multiplier 140 by a constant gain $G_{SA}$. Gain $G_{SA}$ is representative of the servovalve gain $G_S$ and actuator area $G_A$. Afterward, this amplified signal 142 enters a select circuit 144 comprising a maximum select circuit 146 and a minimum select circuit 148. Maximum select circuit 146 and minimum select circuit 148 then limit the value of the amplified signal 142 to be within the maximum and minimum rate limits, $\Delta Z_R$ and $\Delta Z_E$, respectively, for the actuator 42. It will be understood that $\Delta Z_R$ is the delta limit in the retracting direction, which is a signal representative of the product of the actuator slew rate $R_R$ in the retracting direction and the time interval $\Delta T$ (e.g., the update rate of the actuator predictor algorithm). $\Delta Z_E$ is the delta limit in the extending direction, which is a signal representative of the product of the actuator slew rate $R_E$ in the extending direction and the time interval $\Delta T$. The output signal 150 from select circuit 144 is known as the estimated rate (per frame) of actuator travel or $\Delta Z_{ACT}$.

In the next part of actuator predictor algorithm 100, maximum and minimum rate estimates, known as $\Delta Z_{ROOF}$ and $\Delta Z_{FLOOR}$, are selected from the current and four previous values of the estimated rate of actuator travel $Z_{ACT}$. As seen in FIG. 3, the maximum limit ($\Delta Z_{ROOF}$) and the minimum limit ($\Delta Z_{FLOOR}$) are chosen by maximum select circuit 162 and minimum select current 164 from inputs 154, 156, 158 and 160, which represent the current and four previous values of $\Delta Z_{ACT}$. This is accomplished by means of time delays 166, 168, 170 and 172. Accordingly, the worst case transport delay (in this case up to 0.1 second) from torque motor current $I_{MA}$ to actuator position is tolerated. Most importantly, the minimum and maximum rate estimates, $\Delta Z_{FLOOR}$ and $\Delta Z_{ROOF}$ are guaranteed to encompass all possible changes in feedback position due to the torque motor current $I_{MA}$. In order to calculate the maximum actuator value $Z_{ROOF}$ and minimum actuator value $Z_{FLOOR}$, the maximum rate and minimum rate estimates, $\Delta Z_{ROOF}$ and $\Delta Z_{FLOOR}$, are added to certain base values $Z_{bROOF}$ and $Z_{bFLOOR}$ in adders 174 and 176, the resultant maximum and minimum signals 178 and 180 are limited by the maximum retraction $Z_R$ (in maximum select circuits 179 and 181) and maximum extension $Z_E$ (in minimum select circuits 183 and 185) mechanical limits of the actuator, as well as a tolerance $\Delta Z_{TOL}$. The tolerance $\Delta Z_{TOL}$ is sized to allow for sensor noise, as well as worst case variation of servovalve gain, slew rate, and null bias current. Accordingly, it will be seen that the tolerance $\Delta Z_{TOL}$ will be added to signal 184 in adder 187 to calculate the maximum actuator value $Z_{ROOF}$, while the tolerance $\Delta Z_{TOL}$ is subtracted from signal 186 in adder 189 to calculate the minimum actuator value $Z_{FLOOR}$.

As seen in FIG. 3, the base values $Z_{bROOF}$ and $Z_{bFLOOR}$ are equal to the feedback signal $Z_{LVDT}$ from the previous frame, provided the feedback signal $Z_{LVDT}$ is less than the calculated maximum actuator value $Z_{ROOF}$ and greater than the calculated minimum actuator value $Z_{FLOOR}$, as evidenced by function blocks 188 and 190, switches 192 and 194, and AND Gate 196. Otherwise, should $Z_{ROOF}$ be less than $Z_{LVDT}$ or $Z_{FLOOR}$ greater than $Z_{LVDT}$, the calculated maximum value $Z_{ROOF}$ of the previous frame will be utilized as the base value $Z_{bROOF}$ and the minimum value $Z_{FLOOR}$ of the previous frame will be utilized as the base value $Z_{bFLOOR}$ (i.e., where a false reading from function block 188 or 190 is found). It will be noted that time delays 198 and 199 are provided between switches 192 and 194 and the respective adders 174 and 176 so that the feedback signal $Z_{LVDT}$ or maximum value $Z_{ROOF}$/minimum value $Z_{FLOOR}$ from the previous frame is utilized as the maximum and minimum base values $Z_{bROOF}$ and $Z_{bFLOOR}$.

After the maximum and minimum actuator values $Z_{ROOF}$ and $Z_{FLOOR}$, respectively, are calculated, they are then input into a validity filter 200 along with feedback signal $Z_{LVDT}$ (see FIG. 2). It will be understood that validity filter 200 will declare a fault (as seen by fault flag 201) based upon both the persistence and magnitude of the error. One formula which may be used in validity filter 200 to calculate a normalized error, which gives a measure of the likelihood of a failure detection, is as follows:

$$\text{MODEL ERROR} = \frac{Z_{LVDT} - (Z_{ROOF} + Z_{FLOOR})/2}{Z_{ROOF} - Z_{FLOOR}} \times 100\%$$

It will be seen that at no time does the actuator predictor algorithm 100 interfere with the regulator loop of the feedback control system 56. Provided the model error is sufficient, validity filter 200 will declare a fault and fault flag 201 will then be sent to controller 36. Because the actuator predictor algorithm 100 and validity filter 200 determine faults on a frame by frame basis, there is no accumulation of errors as found in the prior art systems. Further, as evidenced by the tolerance $\Delta Z_{TOL}$ incorporated into the actuator predictor algorithm 100, the difference between the maximum actuator value $Z_{ROOF}$ and the minimum actuator value $Z_{FLOOR}$ will increase for as long as the feedback signal $Z_{LVDT}$ remains outside $Z_{ROOF}$ and $Z_{FLOOR}$. This expanding window between the maximum actuator output value $Z_{ROOF}$ and minimum actuator value $Z_{FLOOR}$ is due to the growing uncertainty in actuator position after a failure, and is utilized to help prevent false faults from being determined in later frames or time intervals.

Figure 4:
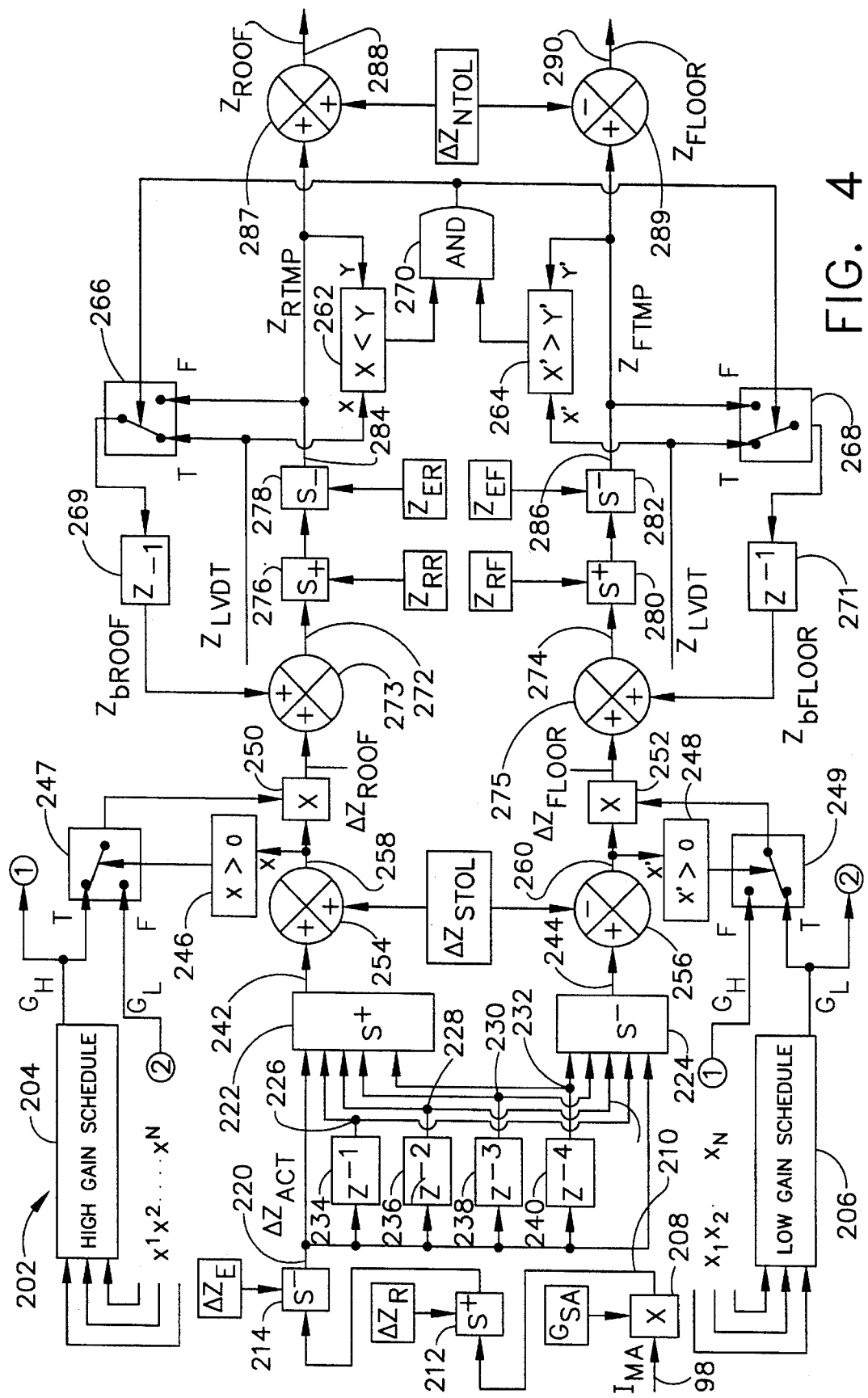
FIG. 4 illustrates a schematic diagram of a further embodiment of the predictor algorithm according to the present invention.

FIG. 4 illustrates an alternative embodiment for the actuator predictor algorithm, being designated generally as 202. The actuator predictor algorithm 202 may be utilized in environments where the servovalve gain $G_S$ varies significantly over engine operating conditions. Generally speaking, the scheduled variable gains to be utilized depend upon the extension or retraction of the actuator. For example, a high gain is utilized for calculating the maximum actuator value $Z_{ROOF}$ and a low gain is utilized when determining the minimum actuator value $Z_{FLOOR}$ when the actuator is in the process of extending. This helps to broaden the range between $Z_{ROOF}$ and $Z_{FLOOR}$ during that extension process. Should the actuator be in a retraction process, a lower gain will be utilized for the maximum actuator value $Z_{ROOF}$ and a higher gain will be utilized for calculating the minimum actuator value $Z_{FLOOR}$, thereby restricting the range therebetween. The high gain schedule 204 and the low gain schedule 206 depicted in FIG. 4 will vary depending upon the actuator utilized, but for a fan inlet guide vane actuator, for example, the high gain schedule 204 will vary from 0.58–1.38 and the low gain schedule 206 will vary from 0.20–0.38. It will be understood that high gain schedule 204 and low gain schedule 206 are dependent on a number of factors, including hydraulic supply and return pressures, actuator external loads (such as aerodynamic forces on variable geometry surfaces), actuator internal loads (such as forces due to friction, springs, and masses of actuation system linkages), head and rod areas of the actuator piston, and engine operating condition.

As shown in FIG. 4, the torque motor current $I_{MA}$ (input 98 in FIG. 2) is multiplied by a constant gain $G_{SA}$ (where such gain is at maximum power and with no loading) in multiplier 208. The amplified signal 210 then enters a maximum select circuit 212 and a minimum select circuit 214 to ensure that amplified signal 210 is within the delta limit in the retracting direction $\Delta Z_R$ and the delta limit in the extending direction $\Delta Z_E$. The output signal 220 from maximum and minimum circuits 212 and 214 is known again as the estimated rate (per frame) of actuator travel $\Delta Z_{ACT}$. The current $\Delta Z_{ACT}$ is then input into maximum and minimum select circuits 222 and 224 along with the four previous values 226, 228, 230 and 232 of the estimated rate of actuator travel $\Delta Z_{ACT}$, as expressed logically by time delays 234, 236, 238 and 240. Provided the maximum value signal 242 and the minimum value signal 244 are each greater than zero after a servovalve tolerance $\Delta Z_{STOL}$ has been added and subtracted, respectively, as shown by function blocks 246 and 248, a high value gain will be utilized in amplifying means 250 and a low value gain will be utilized in amplifying means 252. Should the maximum value signal 242 and the minimum value signal 244 (after the servovalve tolerance has been applied thereto) not be greater than zero (or false), a low value gain will be utilized in amplifying means 250 and a high value gain will utilized in amplifying means 252. This is shown schematically by switches 247 and 249. Before being multiplied by such gains in amplifying means 250 and 252, however, the maximum value signal 242 and the minimum value signal 244 are each subjected to a certain servovalve tolerance related to uncertainties in the servovalve known as $\Delta Z_{STOL}$ as stated above. In particular, it will be seen that the maximum value signal 242 and servovalve tolerance $\Delta Z_{STOL}$ are added and minimum value signal 244 subtracts the servovalve tolerance $\Delta Z_{STOL}$ therefrom in adders 254 and 256. Thereafter, the resultant maximum and minimum signals 258 and 260 are multiplied by the appropriate gains in amplifying means 250 and 252 in order to calculate the maximum rate estimate $\Delta Z_{ROOF}$ and the minimum rate estimate $\Delta Z_{FLOOR}$.

The maximum and minimum rate estimates $\Delta Z_{ROOF}$ and $\Delta Z_{FLOOR}$ are then added to the base values $Z_{bROOF}$ and $Z_{bFLOOR}$, respectively. As described hereinabove with respect to FIG. 3, the base values $Z_{bROOF}$ and $Z_{bFLOOR}$ will be the feedback signal $Z_{LVDT}$ from the previous frame provided feedback signal $Z_{LVDT}$ is less than (a true signal) a temporary maximum actuator value $Z_{RTMP}$ and it is greater than (a true signal) a temporary minimum actuator value $Z_{FTMP}$. Should at least one of these conditions not be met, however, the temporary maximum actuator value $Z_{RTMP}$ and the temporary minimum actuator value $Z_{FTMP}$ from the previous frame will be utilized as the base values $Z_{bROOF}$ and $Z_{bFLOOR}$. This logic is seen from function blocks 262 and 264, switches 266 and 268, AND gate 270, and time delays 269 and 271.

It will be seen that once the maximum and minimum rate estimates $\Delta Z_{ROOF}$ and $\Delta Z_{FLOOR}$ are added to the maximum and minimum base values $Z_{bROOF}$ and $Z_{bFLOOR}$ in adders 273 and 275, the resultant signals 272 and 274 are then subjected to the upper and lower mechanical limits of the actuator, More specifically, the maximum resultant signal 272 is subjected to the maximum retracted position for the roof $Z_{RR}$ in maximum select circuit 276 and the maximum extended position for the roof $Z_{ER}$ in minimum select circuit 278. Likewise, minimum resultant signal 274 is subjected to the minimum retracted position for the floor $Z_{RF}$ in maximum select circuit 280 and the minimum extended position for the floor $Z_{EF}$ in minimum select circuit 282. Upon limiting maximum actuator value 272 and minimum actuator value 274 to such mechanical actuator limits, temporary roof and floor signals ($Z_{RTMP}$ and $Z_{FTMP}$) 284 and 286 are then subjected to another tolerance $\Delta Z_{NTOL}$ related to uncertainties in noise. Temporary roof signal 284 is added to the noise tolerance $\Delta Z_{NTOL}$ in adder 287 while the noise tolerance $\Delta Z_{NTOL}$ is subtracted from temporary floor signal 286 in adder 289. The output signals therefrom 288 and 290 are the maximum actuator value $Z_{ROOF}$ and the minimum actuator value $Z_{FLOOR}$ which is input into the validity filter 200 as discussed hereinabove. It will be understood that the tolerances for the servovalve and for noise, $\Delta Z_{STOL}$ and $\Delta Z_{NTOL}$, respectively, are split within the actuator predictor algorithm 202 in order to prevent the maximum actuator value $Z_{ROOF}$ and the minimum actuator value $Z_{FLOOR}$ from growing as fast as in the actuator predictor algorithm 100.

While the preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appending claims.

What is claimed is:

1. A control system for an actuator, comprising:
   (a) an actuator feedback control for said actuator including:
      (i) means for providing a feedback signal indicative of an output position of said actuator;
      (ii) means for comparing an output position demand signal for said actuator with said feedback signal for providing an actuator output position error signal; and
      (iii) means for providing to said actuator an input signal proportional to said output position error signal; and
   (b) a fault detection system including:
      (i) an algorithm for continuously determining a maximum limit and a minimum limit for said actuator output position based on a maximum estimated rate of actuator output and a minimum estimated rate of actuator output; and
      (ii) means for comparing said feedback signal to said actuator output position maximum and minimum limits and providing a fault indication upon exceeding the bounds thereof.

2. The actuator control system of claim 1, wherein said algorithm determines said maximum limit by adding said maximum estimated rate of actuator output to a base actuator output position.

3. The actuator control system of claim 2, wherein said base actuator output position is said feedback signal when said feedback signal is less than said actuator position maximum limit and greater than said actuator position minimum limit.

4. The actuator control system of claim 2, wherein said base actuator output position is an actuator position maximum limit from a previous time interval when said feedback signal is not within a range between said actuator position maximum and minimum limits.

5. The actuator control system of claim 1, wherein said algorithm determines said minimum limit by adding said minimum estimated race of actuator output to a base actuator output position.

6. The actuator control system of claim 5, wherein said base actuator output position is said feedback signal when said feedback signal is less than said actuator position maximum limit and greater than said actuator position minimum limit.

7. The actuator control system of claim 5, wherein said base actuator output position is an actuator position minimum limit from a previous time interval when said feedback signal is not within a range between said actuator position maximum and minimum limits.

8. The actuator control system of claim 1, wherein said algorithm determines said maximum estimated rate of actuator output selected from an estimated rate of actuator output for a current time interval and the estimated rate of actuator output for a specified number of previous time intervals.

9. The actuator control system of claim 8, wherein said specified number of time intervals is four.

10. The actuator control system of claim 8, wherein said estimated rates of actuator output are derived from a torque motor current of said actuator proportional to said actuator output position error signal.

11. The actuator control system of claim 10, wherein said torque motor current is limited by the slew rate limits of said actuator in the extending and retracting directions.

12. The actuator control system of claim 1, wherein said algorithm determines said minimum estimated rate of actuator output from an estimated rate of actuator output for a current time interval and the estimated rate of actuator output for a specified number of previous time intervals.

13. The actuator control system of claim 12, wherein said specified number of time intervals is four.

14. The actuator control system of claim 1, wherein said algorithm includes means for maintaining said actuator output position within the mechanical limits of said actuator.

15. The actuator control system of claim 14, wherein a specified tolerance is added to said maximum actuator output position limit.

16. The actuator control system of claim 1, wherein said algorithm includes means for maintaining said actuator output position within the mechanical limits of said actuator.

17. The actuator control system of claim 16, wherein a specified tolerance is subtracted from said minimum actuator output position limit.

18. The actuator control system of claim 1, wherein said comparing means is a validity filter.

19. The actuator control system of claim 1, wherein a high gain schedule is applied to said maximum estimated rate of actuator output in said algorithm if said maximum estimated rate of actuator output is greater than zero.

20. The actuator control system of claim 1, wherein a low gain is applied to said maximum estimated rate of actuator output in said algorithm if said maximum estimated rate of actuator output is not greater than zero.

21. The actuator control system of claim 1, wherein a low gain schedule is applied to said minimum estimated rate of actuator output in said algorithm if said minimum estimated rate of actuator output is greater than zero.

22. The actuator control system of claim 1, wherein a high gain is applied to said minimum estimated rate of actuator output in said algorithm if said minimum estimated rate of actuator output is less than zero.

23. The actuator control system of claim 1, wherein said algorithm adds a servovalve tolerance to said maximum estimated rate of actuator output.

24. The actuator control system of claim 1, wherein said algorithm subtracts a servovalve tolerance from said minimum estimated rate of actuator output.

25. The actuator control system of claim 1, wherein said algorithm adds a noise tolerance to said actuator position maximum limit prior to comparison with said feedback signal.

26. The actuator control system of claim 1, wherein said algorithm subtracts a noise tolerance from said actuator position minimum limit prior to comparison with said feedback signal.

* * * * *